UNITED STATES PATENT OFFICE.

NELSON S. WHITE, OF CANTON, MASSACHUSETTS.

RUBBER-SURFACED FABRIC AND COMPOSITION THEREFOR.

SPECIFICATION forming part of Letters Patent No. 296,258, dated April 1, 1884.

Application filed December 3, 1883. (Specimens.)

*To all whom it may concern:*

Be it known that I, NELSON S. WHITE, of Canton, in the county of Norfolk and State of Massachusetts, a citizen of the United States, have invented a new and useful Improvement in Rubber-Surfaced Fabrics and Composition Therefor, of which the following is a full, clear, and exact description.

This invention relates to the manufacture of rubber-surfaced fabrics; and it especially consists in providing said fabric with a permanent coloring of brilliancy, and in slowly curing the rubber or gutta-percha, whereby the surface of the fabric remains soft, pliable, coherent, tenacious, and has a peculiar leathery feeling.

In practicing the invention I make what I call the "filling"—that is, the compound which is mixed with the dissolved india-rubber or gutta-percha, or both, to cure it and give it body and color—of sulphur or suphide, oxide of zinc, and suitable coloring pigment, in substantially the following quantities or proportions: While the proportion these ingredients bear to each other may be considerably varied without departing from the spirit of the invention, I prefer to use a quantity of sulphide carrying about twenty per cent. of sulphur, or about twenty per cent. of sulphur, fifty per cent. of zinc oxide, twenty per. cent of ordinary coloring matter or pigment, and five per cent. of aniline pigment. If less than fifty per cent. of oxide of zinc is used, it will be desirable to employ in the place of it precipitated silicate of soda. For instance, if thirty-five or forty per cent. of oxide of zinc is employed, then from ten to fifteen per cent. of the precipitated silicate should be used. The percentage of the materials entering into the compound may be varied considerably from this formula and good results will be obtained, so that I do not confine myself strictly to the above proportions. As the zinc oxide cannot be wet with water or alcohol without destroying its chemical properties for the purpose for which it is used, and also for the purpose of uniformly coloring the zinc oxide with the pigment, it is necessary that it be ground or rubbed into the other ingredient in a dry state, and a desirable way of doing this is to place the sulphide or sulphur and coloring-matter and zinc oxide in an iron drum or similar receptacle adapted to be revolved, and in which are loose iron balls, and the action of the balls upon these ingredients as the drum is revolved thoroughly incorporates and colors the zinc oxide with the other elements. The filling thus prepared is then bolted. It is essential that all the materials used in making this filling should be thoroughly dried before mixing, mixed dry, and kept dry until used with the composition. The rubber or rubber and gutta-percha is dissolved in naphtha in about the proportion of from a pound to a pound and a half to the gallon, and the filling compound is added to the rubber composition in about the proportion of one pound of the filling compound to one gallon of the composition, whether rubber or gutta-percha, and is intimately mingled with it by suitable mechanical means.

The composition thus prepared is applied to the surface of suitable fabric in one or more coats in any desirable way, and is pebbled or surface-finished in any suitable manner.

The coloring matter or pigment employed may be divided into two parts—namely, about twenty-five parts of ordinary coloring-pigment which has or approaches the shade or color which it is desired the fabric shall have, and about five parts aniline pigment, which give brilliancy, tone, and permanency to this other common pigment.

The coloring-matter which I call "aniline pigment" I make in substantially this manner: A quantity of about one hundred pounds contains about fifty pounds of china-clay, forty-four pounds Westminster paris-white, five pounds precipitated silicate of soda, one pound of aniline. These materials are intimately mingled together before use in seven gallons of hot water, and I make, generally, from about five per cent. of my filling composition of this aniline pigment.

Of course the proportions above indicated may be varied to some considerable extent without varying the character of the pigment.

When gutta-percha is used, in order to prevent granulation and hardening of the surface of the cloth, it is desirable to add to the composition from five to twenty per cent. of gum-dammar or any equivalent gum, and use from five to seven per cent. more of sulphide or sulphur in the filling composition. The use of the zinc oxide as a filling in connection with aniline coloring or dyes I find to be of great advantage, because it acts as a mordant for the coloring-matter, and especially the aniline, and preserves the brilliancy and tone of the color to a very marked extent.

The use of zinc oxide about in the proportion named in connection with the sulphide or sulphur and rubber or gutta-percha provides for a very slow and continuous curing of the rubber or gutta-percha, so that the compound, when applied to the fabric and set thereon by pressure and the evaporation of the naphtha, will remain soft and pliable, coherent, and tenacious for a long time, and the surface of the goods will have a soft, unctuous, leathery feeling.

As a substitute for either the gutta-percha or rubber, I may use in the rubber compound a quantity of gum-balata not exceeding fifty per cent. of the rubber.

In some instances it will be desirable to make the first coating of the fabric of the all rubber or rubber and gum-balata or all gum-balata composition well charged with the pigment of the color desired. This may be spread thereon in one or more layers. To the surface of this coating one or more coats of the gutta-percha compound is then applied. This process of manufacture, it will be observed, interposes between the gutta-percha surfacing layer and the fabric a layer of more elastic material than the gutta-percha coating, and one which will remain elastic and flexible longer than the gutta-percha layer, so that if the gutta-percha coating should have a tendency to crack, the interposed rubber or balata layer will prevent the crack from extending through to the cloth and exposing its color or texture. Moreover, by interposing this intermediate layer of rubber or balata solution, the cloth can be bent or folded over a corner or sharp edge without any liability of cracking the gutta-percha surfacing; and, as above stated, even if there should be a slight tendency to crack, as sometimes is the case, owing, perhaps, to the age of the goods, or to some other cause, the rubber layer prevents the crack from extending to the cloth, and this renders it unnecessary to prepare the cloth previously by dyeing to the color it is intended the goods shall have, as is now the custom.

In lieu of coloring the zinc-oxide filling in the manner above described, we may prepare it substantially in this manner: To two hundred pounds of zinc oxide add from three to ten pounds of aniline dissolved in alcohol. Intimately mix the oxide and dissolved aniline, and dry. This will of course brilliantly color the zinc oxide. To this colored oxide then add dry uncolored zinc oxide and sulphur, and intimately mix them together by attrition, as above described. The quantity of uncolored dry zinc oxide added will depend upon the tint and brilliancy of the color desired. The proportion of sulphur to the entire filling will be the same as above described.

The precipitated silicate of soda which is herein referred to is obtained by treating silicate of soda with acetic acid to neutralize the free alkali in the soda and to obtain a fine silex. Silicate thus prepared, I have ascertained, is an excellent mordant for the aniline color; but of course I can use any silicate that shall give me the advantages of the product obtained in this manner.

Among the sulphides which may be used in the composition are the sulphides of zinc, iron, antimony, or copper.

Having thus fully described my invention, I claim and desire to secure by Letters Patent of the United States—

1. A close-textured fabric surface-coated with a composition consisting of dissolved india-rubber and gutta-percha and a filling of zinc-white, sulphur, or sulphide and coloring pigments of the character and in the proportion described, all substantially as set forth, and for the purpose described.

2. A close-textured fabric surface-coated with a gutta-percha composition containing gum-dammar, all substantially as and for the purpose described.

3. The aniline pigment consisting of aniline, china-clay, and precipitated silicate of soda, in the proportions named, all substantially as and for the purpose described.

4. In the manufacture of rubber or gutta-percha surfaced fabric, the zinc mordant described, obtained by coloring by attrition while dry, zinc oxide with suitable pigments, all substantially as and for the purposes described.

5. In the manufacture of india-rubber or gutta-percha fabrics, the use of zinc oxide in substantially the proportions named, to gradually cure the composition with which the fabric is coated, all substantially as and for the purposes described.

6. In a rubber or gutta-percha surfaced fabric, a close-textured cloth coated with an elastic and flexible solution, which, in turn, is covered by a surfacing of a less elastic composition, all substantially as and for the purposes described.

7. The combination, in an india-rubber and gutta-percha surfaced fabric, of a close-textured cloth, a coating of colored rubber or other similar elastic and flexible composition, and a surfacing coat of colored gutta-percha composition applied to the surface of the rubber composition, all substantially as and for the purposes described.

NELSON S. WHITE.

Witnesses:
F. F. RAYMOND, 2d,
FRED. B. DOLAN.